United States Patent
Bahai et al.

[11] Patent Number: 6,067,295
[45] Date of Patent: May 23, 2000

[54] METHOD AND APPARATUS FOR REDUCING ERROR IN RECOVERING INFORMATION BITS IN A WIRELESS SYSTEM

[75] Inventors: Ahmad R. Bahai, Edison; Mohsen Sarraf, Rumson; James Paul Seymour, Lake Hiawatha, all of N.J.

[73] Assignee: Lucent Technologies, Inc., Murray Hill, N.J.

[21] Appl. No.: 08/782,357

[22] Filed: Jan. 13, 1997

[51] Int. Cl.[7] .................................................. H04B 15/00
[52] U.S. Cl. ..................... 370/350; 370/286; 375/348; 375/350; 379/407
[58] Field of Search ..................................... 370/350, 347, 370/286, 345, 310, 282, 276; 375/347, 340, 348, 231, 229, 230, 343, 346, 350; 379/406, 411, 407, 410

[56] References Cited

U.S. PATENT DOCUMENTS

| | | | |
|---|---|---|---|
| 4,852,090 | 7/1989 | Borth | 370/347 |
| 5,191,598 | 3/1993 | Backstrom et al. | 375/347 |
| 5,222,101 | 6/1993 | Ariyavisitakul et al. | 375/231 |
| 5,257,265 | 10/1993 | Su et al. | 375/348 X |
| 5,303,263 | 4/1994 | Shoji et al. | 375/229 |
| 5,436,942 | 7/1995 | Cheng et al. | 375/229 |
| 5,450,442 | 9/1995 | Umemoto et al. | 375/230 |
| 5,692,011 | 11/1997 | Nobakht et al. | 375/348 X |
| 5,729,558 | 3/1998 | Mobin | 375/346 X |
| 5,805,638 | 9/1998 | Liew | 375/231 |
| 5,872,801 | 2/1999 | Mobin | 371/43 |
| 5,898,684 | 4/1999 | Currivan et al. | 370/350 |

*Primary Examiner*—Michael Horabik
*Assistant Examiner*—William H. Wilson, Jr.

[57] ABSTRACT

An efficient method and apparatus for reducing the effect of ghost signals during the recovery of information bits in wireless systems. The delay spread between each burst and its ghost are estimated so that an equalizer is only engaged to eliminate the effects of the ghost on data recovery when the delay spread increases beyond a given threshold. The estimation of the nonstationary delay spread is based on the estimation of the impulse response of the wireless channel. That is, the response of how the burst and its ghost will be reflected in the wireless channel. Since, the burst and its ghost arrive at the receiver τ symbol times apart and have different and random power with respect to each other, once the channel impulse is accurately estimated, the value of τ can be used to determine whether to engage or disengage an equalizer. That is, the equalizer is only turned on if τ is beyond a predetermined threshold, wherein the threshold is chosen depending on the needs and/or specifications of the system performance.

40 Claims, 3 Drawing Sheets

METHOD AND APPARATUS FOR REDUCING ERROR IN RECOVERING INFORMATION BITS IN A WIRELESS SYSTEM

FIELD OF THE INVENTION

This invention relates to wireless communications systems, and more particularly to the recovery of information bits transmitted through a wireless channel.

BACKGROUND OF THE INVENTION

In communicating information bits from a transmitter to a receiver through a wireless channel, the received bits must be demodulated and decoded so that the transmitted information bits can be accurately recovered. For example, in a wireless system that communicates by time division multiple access (TDMA) bursts, the transmitted burst goes through a transmitter, the channel and a receiver. In making this trek, however, the burst acquires imperfections which, in turn, make decoding of the burst error prone.

One of these imperfections is delay spread. Delay spread is caused by the reception of a burst in more than one instant at the receiver. In most wireless systems, the main concern involving delay spread is the effect of receiving a burst at more than one time instant (e.g. a burst and its ghost), wherein the power of each is different from the other. This problem is similar to the problems associated with the appearance of ghosts in TV images, which are caused by the reception of the transmitted signal by the TV antenna at two different instances.

An illustrative view of the timing involved in receiving a burst and its ghost at two different instances is shown in FIG. 1. As shown, a burst 10 and its ghost 11 arrive at the receiver at two different time instants. That is, burst 10 arrives at time 12 and its ghost 11 arrives at a later time 13. The difference between times 12 and 13 is the delay spread, hereinafter referred to as delay spread 14. Thus, delay spread 14 is the measure of time between the reception of the burst 10 and its ghost 11 at the receiver. It is this delay spread 14 that can significantly affect the decoding of the information bits received.

In a wireless system, the decoding problems associated with delay spread become more drastic because such systems transmit the information bits over a wireless channel whose characteristics change with time. This results is a time-varying delay spread. That is, a delay spread that changes with time as the wireless channel changes with time. As a result, getting rid of this ghosting problem, i.e. delay spread, to recover information bits in a wireless system can be an arduous task, and thus may require a complex decoding mechanism in the receiver. Consequently, depending on the distance of the delay spread and the strength of the ghost signal received, the receiver may require extra circuitry to reduce the effect of the ghost signal on the decoding of the information bits received for each burst. For example, the receiver may need to utilize an equalizer to get rid of the ghost before attempting to accurately recover the information bits for each burst.

In a wireless environment, however, constant use of an equalizer may not be the best approach for proper decoding of the received information bits. In general, in a wireless system wherein the channel varies very drastically and very quickly, the constant use of an equalizer to recover the information bits can be detrimental to the costs associated with recovering the information bits at the receiver if the equalizer was not absolutely necessary for reducing the effect of a ghost during reception of the burst. More specifically, in a wireless system wherein the ghost is received very close in time to the reception of the original burst, then no equalization is needed to minimize the effect of ghost-images. Whereas, if the ghost has significant power compared to the burst, and if the delay spread between the burst and the ghost is sufficiently large, then an equalizer is necessary to provide accurate information recovery at the receiver. As a result, depending on the strength of the ghost signal and the size of the delay spread between the burst and its ghost, an equalizer may or may not be needed for correct information bit recovery. Thus, wireless systems that employ an equalizer to minimize the effects of a ghost signal at the receiver are not efficient during times when the ghost is weak and/or close, in time, to the burst. And, wireless systems that do not employ an equalizer are not efficient when the ghost is strong and far, in time, from the burst.

SUMMARY OF THE INVENTION

Accordingly, the present invention is directed to an efficient method and apparatus for reducing the effect of ghost signals during the recovery of information bits in wireless systems. To attain this, the present invention provides a scheme for estimating the delay spread between a burst and its ghost so that an equalizer is only engaged to eliminate the effects of the ghost signal when the delay spread increases beyond a set threshold in time.

In general, the method for estimating the nonstationary delay spread of a wireless communication according to the present invention is based on the impulse response of the wireless channel. That is, the present invention estimates the presence and significance of delay spread in a wireless system by estimating how the burst and its ghost will be reflected in the wireless channel. More specifically, since the two images of a burst (i.e. the original and its ghost) arrive at the receiver $\tau$ symbol times apart (i.e. delay spread) from each other, and have different and random power with respect to each other, once the channel impulse is accurately estimated, the value of $\tau$ can be used to determine whether to engage or disengage an equalizer to provide accurate data recovery. That is, the present invention provides a method and apparatus for efficient recovery of information bits in a wireless system wherein an equalizer is only used to decode the received information bits when the delay spread increases by more than some predetermined amount, wherein the predetermined amount depends on the needs and/or specifications of the wireless system.

In one embodiment, a correlator is employed to measure the impulse response of the wireless channel by estimating the correlation between a known sync word embedded in each burst transmitted over the channel and the actual sync word received for each burst. The peak of the correlation for each burst indicates the position of the main tap. Thus, any change in the position of the peak, over time (i.e. for several bursts), directly indicates the presence of a significant burst image or ghost. That is, if the relative position of the correlation peak changes significantly for several bursts, it can be concluded that the delay spread between the burst and its ghost is large enough and the strength of the ghost is significant enough to hamper accurate recovery of the information bits carried by the bursts. Conversely, if the relative position of the correlation peak remains substantially stationary for several bursts, then the ghost or burst image is insignificant. Thus, by engaging the equalizer only during times of a nonstationary peak, the receiver can more efficiently recover the information bits transmitted in each burst.

As a result, by monitoring the correlator peak position during reception of bursts transmitted over a wireless channel and by utilizing an equalizer only when a nonstationary peak is found, the present invention overcomes the limitations of the prior art. These and other features of the invention are described in more detail in the following detailed description of the embodiments of the invention when taken with the drawings. The scope of the invention, however, is limited only by the claims appended hereto.

DETAILED DESCRIPTION OF ILLUSTRATIVE EMBODIMENTS OF THE INVENTION

As discussed above, in a wireless system that uses an equalizer to decode received information bursts, improved receiver efficiency can be achieved by using the equalizer to decode only those bursts that have a significantly strong image received over the wireless channel at a significant time $\tau$ (i.e. delay spread) after reception of the original burst. Such a burst image is referred to herein as a significant burst image.

One method of determining whether such a significant burst image exists for the received bursts is to estimate the impulse response of the wireless channel. Since the two images of a burst (i.e. the original and its ghost) arrive at the receiver $\tau$ symbol times apart and have different and random power, the delay spread between the two images can be estimated by determining a relative correlator peak position of each image with respect to each other. That is, the peak position of several consecutive bursts can be used to determine whether to engage or disengage an equalizer in recovering information bits transmitted in the bursts.

More specifically, if the relative peak position for several consecutive burst changes by some predetermined amount over time, it can be assumed that a second image of the burst, having a substantial power, is being received at a significant time after the first image, thus causing the change in correlation peak position. As a result, information bit recovery can be made more efficient by limiting use of an equalizer to decode the received bursts to only those times when the correlation peak position varies beyond some predetermined threshold, wherein the threshold is chosen depending on the needs and/or specifications of the system.

Figure 1:
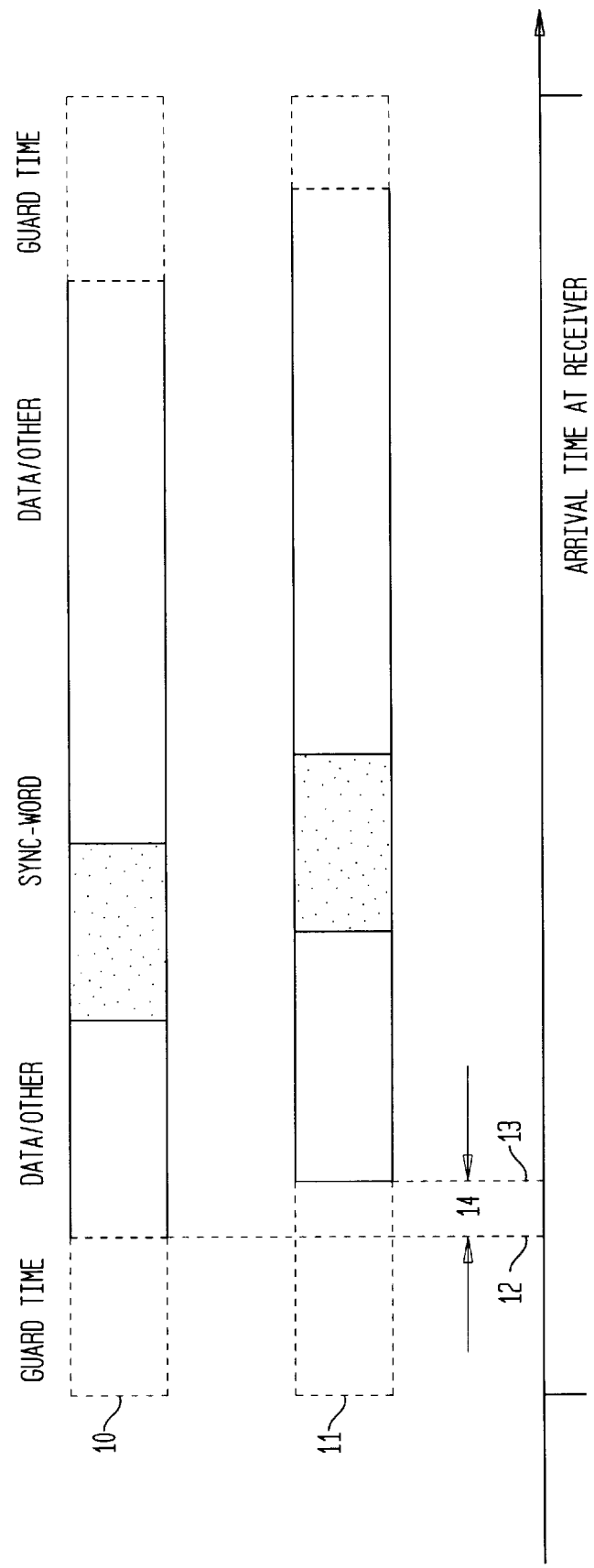
FIG. 1 is a timing diagram illustrating delay spread associated with the reception of a burst and its ghost in a wireless system.
Figure 2:
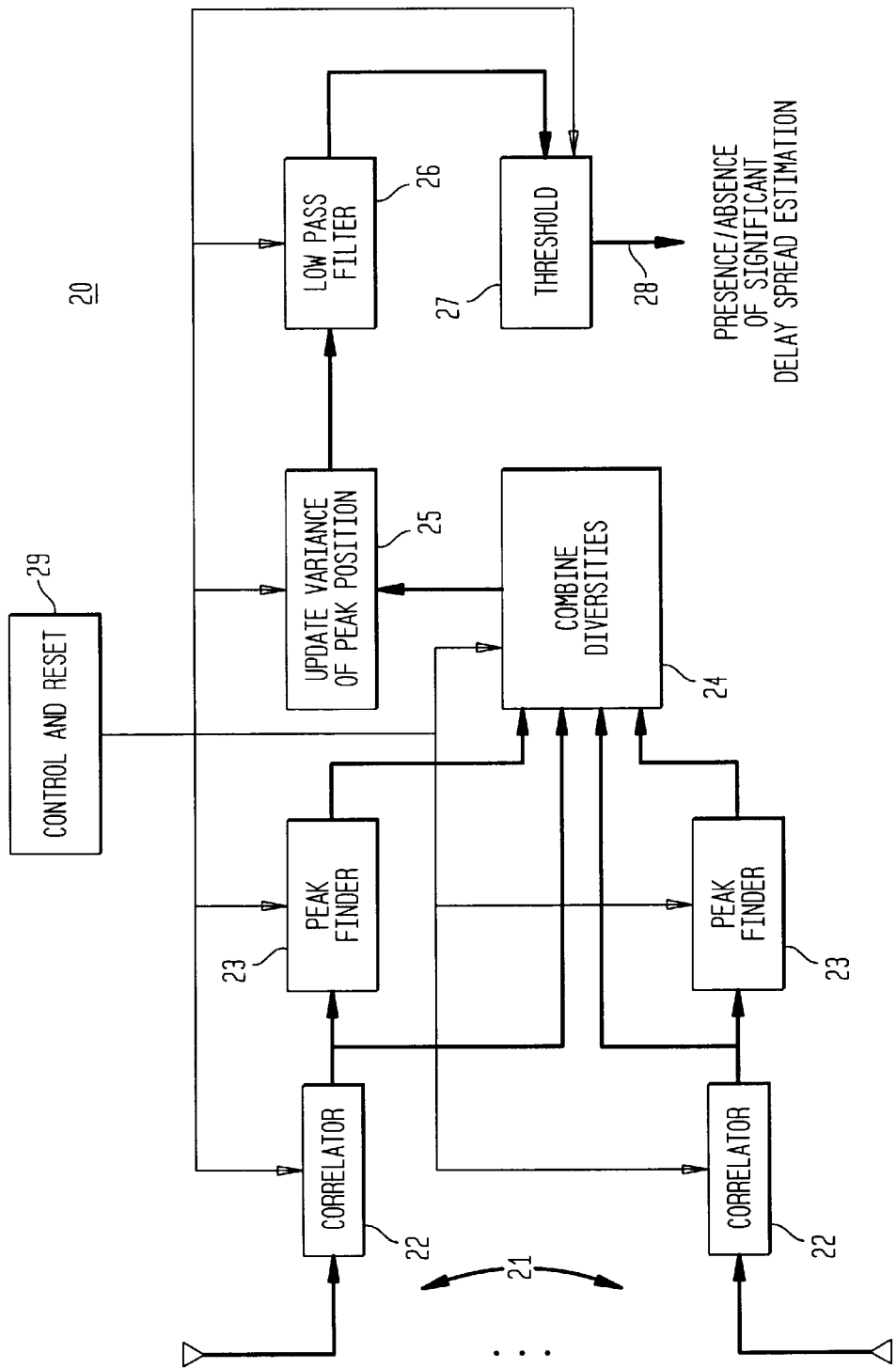
FIG. 2 is a block diagram of one embodiment of an apparatus according to the present invention for reducing error in recovering information bits in a wireless system.

Referring now to FIG. 2, there is shown one embodiment 20 for monitoring the correlator peak position, over time, to efficiently utilize an equalizer in recovering information bits transmitted in bursts over a wireless channel, and thus reduce the harmful effects of ghost images in a wireless system. As shown, embodiment 20 has a plurality of antenna's 21, each of which receives the images of the burst transmitted over the wireless channel (not shown). Each antenna 21 is electrically coupled to a separate correlator 22 which, in turn are electrically coupled to peak finders 23. Each peak finder 23 is electrically coupled to a diversity combiner 24 which, in turn is electrically coupled to a peak position update 25. Peak position update 25 is electrically coupled to a low pass filter 26 which, in turn, is coupled to a threshold detector 27. Threshold detector 27 has an output 28 that indicates whether a significant delay spread exists for each burst received. A control and reset circuit 29 is electrically coupled to correlators 22, peak finders 23, diversity combiner 24, peak position update 25, low pass filter 26 and threshold detector 27.

In operation, each antenna 21 receives the images for each burst transmitted over the wireless channel and communicates those images to correlators 22. For each burst transmitted over the wireless channel, correlators 21 correlate a known word of the burst (e.g. a sync word) with the actual word received in the images of the burst. From this correlation, peak finder 23 estimates a position, in time, of the main tap with respect to the position, in time, of the beginning of the received burst. This peak information is then combined in diversity combiner 24 to determine a substantially accurate peak position of the given word. Peak position update 25 then determines the change in position of the peak for the present burst compared to the determined peak of the previous burst. This information is communicated through low-pass filter 26 to threshold detector 27 which determines whether the peak position has changed by some predetermined threshold amount in a given time. As discussed above, a change in peak position by an amount greater than some threshold indicates the presence of a significant burst image, and thus the need for the use of an equalizer (not shown) to accurately decode the received burst images at the receiver.

Figure 3:
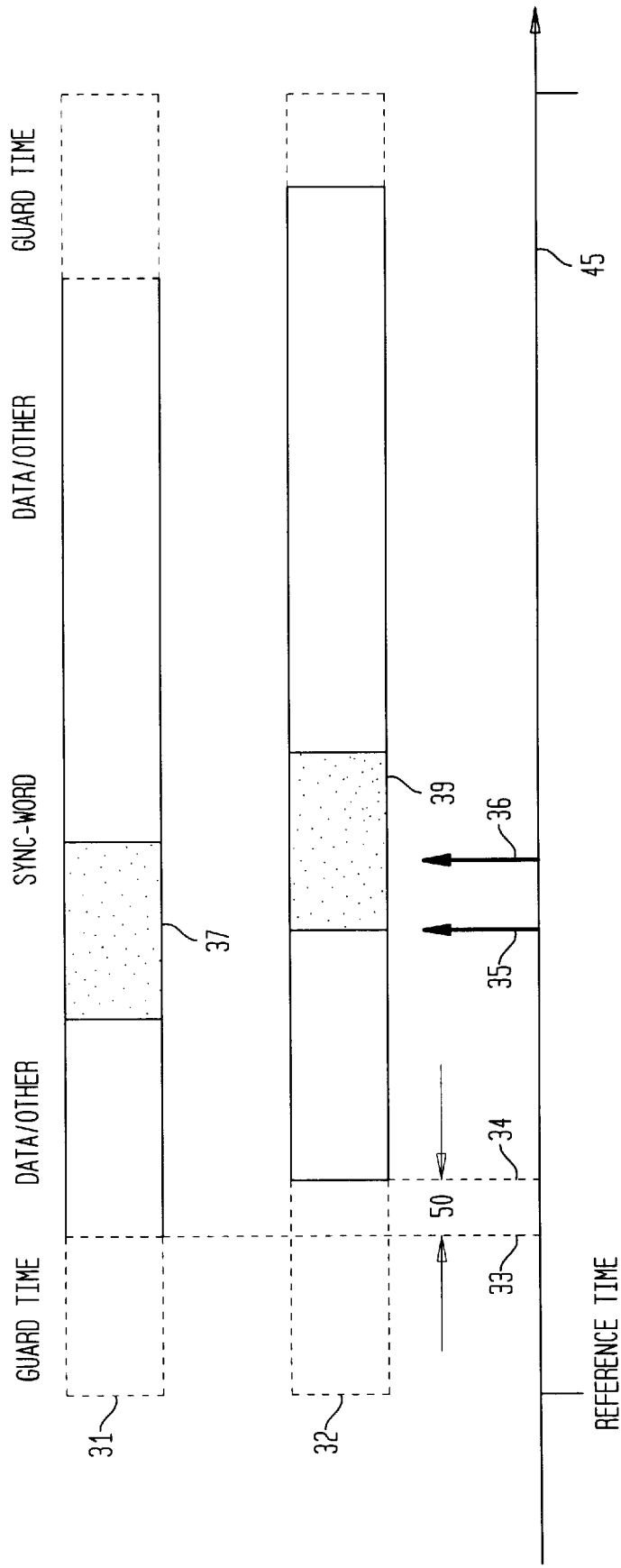
FIG. 3 is a timing diagram illustrating correlator peak position for a burst having two images, and the change in correlator peak position depending on the delay spread and the relative strength of the two images at the receiver.

One method for determining the relative peak position of a received burst, and the effect of the relative strength of the burst image on the correlator peak position is illustrated in FIG. 3. As shown, a single burst having a first image 31 and a second image 32 are received at two different times 33 and 34, respectively, on a wireless channel. The combination of received sync words 37 and 39 for images 31 and 32, respectively, is then correlated with an expected or known sync word for the burst. From this correlation, a correlator peak position is determined, wherein the correlator peak position depends on the delay spread 50 between images 31 and 32 and the relative strength of images 31 and 32.

To illustrate how the above described properties of images 31 and 32 affect the correlator peak position, FIG. 3 shows two correlator peak positions 35 and 36 on reference time line 45. That is, correlator peak position 35 is shown to indicate a peak position that may result when image 31 is stronger than image 32, whereas correlator peak position 36 is shown to illustrate the peak position that may result when image 32 is stronger than 31. As a result, through FIG. 3 it can easily be understood that when the correlator peak position changes for several bursts, the receiver will be subjected to at least two images having a significant delay spread and a significant power with respect to each other. Thus, by limiting use of an equalizer for decoding the received information bits to only those times when such a nonstationary correlator peak position is detected, the efficiency and accuracy of recovering the transmitted information bits can be improved.

One method of quantifying the relative changes in the correlator peak position is to estimate the variance of the peak position relative to the beginning of the burst for each successive burst. Other methods of quantifying such changes in the correlator peak position is to estimate the higher order statistical moments or absolute value of the peak position relative to the beginning of the burst for each successive burst. As a result, to identify whether the peak position is nonstationary over time, the change in peak position relative to the beginning of the burst need only be determined. If the change in peak position relative to the beginning of the burst changes by some predetermined amount over time or over a predetermined number of bursts, then it can be assumed that ghost images are present on the wireless channel and that the ghost images have a strong power compared to the original burst and arrive at the receiver at some non-negligible delay spread after the original burst.

In another method, since the delay spread is nonstationary, the process of estimating the peak position variance is reset after a predetermined number of bursts. In addition, the estimates may be low-pass filtered to reduce the effect of any swift abnormal statistical variations.

In another embodiment, diversity combining is added to the method for finding the variance of peak positions. One method of diversity combining is to receive the bursts on a plurality of antennas, finding the peak position associated with the signal of the antenna with the highest power, and update the peak position variance with respect to that high power peak position. Another method is to simply add the contribution from each antenna in updating the variance between bursts. Yet another method is to add the contribution from each antenna based on its individual received power to update the variance.

There are many other embodiments for providing an efficient method for decoding information bits transmitted over a wireless channel, wherein transmitted burst have images with significant delay spread and power, according to the present invention. The above description only includes exemplary embodiments of the many methods for implementing the present invention. References to specific examples and embodiments in the description should not be construed to limit the present invention in any manner, and is merely provided for the purpose of describing the general principles of the present invention. It will be apparent to one of ordinary skill in the art that the present invention may be practiced through other embodiments.

What is claimed is:

1. A method for recovering information bits transmitted in bursts over a wireless channel, each burst having a given common digital word, the method comprising the steps of:
   a. receiving the bursts transmitted over the wireless channel;
   b. correlating the common digital word of each said received burst with the given common digital word to identify a corrector peak position, in time, for each burst;
   c. analyzing said corrector peak position for a given set of bursts to determine a change in corrector peak position therefor; and
   d. employing a device to accurately recover the information bits, said device being selectively engaged when said corrector peak position changes more than a predetermined amount of time, wherein a corrector peak position change larger than said predetermined amount of time indicates the presence of strong ghost images on the wireless channel.

2. The method of claim 1 further comprising the step of resetting the steps of correlating the received bursts and analyzing the correlator peak positions after receiving a given number of bursts.

3. The method of claim 1 wherein the step of receiving said transmitted bursts is simultaneously performed through a plurality of antennas.

4. The method of claim 3 wherein the step of correlating the common digital word of each received bursts with the given known word is simultaneously performed for said burst received on each said antenna to determine a plurality of correlator peak positions for each burst.

5. The method of claim 4 further comprising the step of diversity combining said plurality of correlator peak positions determined for each burst.

6. The method of claim 1 wherein the transmitted bursts are time division multiple access (TDMA) bursts.

7. The method of claim 6 wherein the given common digital word is a sync word.

8. The method of claim 7 wherein said step of receiving the transmitted bursts is performed through a wireless receiver.

9. The method of claim 8 wherein said wireless receiver is a cellular phone.

10. The method of claim 8 wherein said wireless receiver is a pager.

11. The method of claim 1 wherein said step of correlating the common digital word of the received bursts with the given common digital word is performed through a correlator circuit comprising a correlator and a peak finder.

12. The method of claim 1 wherein said step of analyzing said correlator peak positions is performed through an update circuit comprising a peak variance detector, a low pass filter and a threshold detector.

13. The method of claim 1 wherein said device for accurately recovering said information bits is an equalizer.

14. A method for estimating nonstationary delay spread of burst transmissions in a wireless channel to a receiver, each burst having a given common digital word, the method comprising:
   a. receiving, at the receiver, the bursts transmitted over the wireless channel;
   b. correlating the common digital word of each said received burst with the given common digital word to identify a corrector peak position, in time, for each burst;
   c. analyzing said corrector peak position for a given set of bursts to determine a change in corrector peak position therefor; and
   d. employing a device to accurately recover information bits, said device being selectively engaged when said corrector peak position changes more than a predetermined amount of time wherein a corrector peak position change larger than said predetermined amount of time indicates the presence of strong ghost images on the wireless channel.

15. The method of claim 14 further comprising the step of resetting the steps of correlating the received bursts and analyzing the correlator peak positions after receiving a given number of bursts.

16. The method of claim 14 wherein the step of receiving said transmitted bursts is simultaneously performed through a plurality of antennas.

17. The method of claim 16 wherein the step of correlating the common digital word of each received bursts with the given known word is simultaneously performed for said burst received on each said antenna to determine a plurality of correlator peak positions for each burst.

18. The method of claim 17 further comprising the step of diversity combining said plurality of correlator peak positions determined for each burst.

19. The method of claim 14 wherein the transmitted bursts are time division multiple access (TDMA) bursts.

20. The method of claim 19 wherein the given common digital word is a sync word.

21. The method of claim 20 wherein said step of receiving the transmitted bursts is performed through a wireless receiver.

22. The method of claim 21 wherein said wireless receiver is a cellular phone.

23. The method of claim 21 wherein said wireless receiver is a pager.

24. The method of claim 14 wherein said step of correlating the common digital word of the received bursts with the given common digital word is performed through a correlator circuit comprising a correlator and a peak finder.

25. The method of claim 14 wherein said step of analyzing said correlator peak positions is performed through an update circuit comprising a peak variance detector, a low pass filter and a threshold detector.

26. The method of claim 14 wherein said apparatus to accurately recover said information bits is an equalizer.

27. An apparatus for reducing error in recovering information bits transmitted in bursts over a wireless channel, each burst having a given common digital word, the apparatus comprising:
   a receiver for receiving said transmitted bursts; said receiver including a ghost detector; and
   an equalizer, being selectively engaged to support said receiver in recovering the information bits when said ghost detector indicates the presence of ghost images at a predetermined level of delay spread among said received transmitted burst common digital word.

28. The apparatus of claim 27 further comprising a reset circuit for resetting the ghost detector after said receiver receives a given number of bursts.

29. The apparatus of claim 28 wherein said receiver receives said transmitted bursts through a plurality of equally spaced antennas.

30. The apparatus of claim 29 wherein each antenna sends the received burst to a separate correlator for simultaneously correlating the common digital word of the received burst from each antenna to determine a plurality of correlator peak positions for each burst.

31. The apparatus of claim 30 further comprising a diversity combiner for combining said plurality of correlator peak positions determined for each burst.

32. The apparatus of claim 27 wherein the transmitted bursts are time division multiple access (TDMA) bursts.

33. The apparatus of claim 32 wherein the given common digital word is a sync word.

34. The apparatus of claim 33 wherein said receiver is a wireless receiver.

35. The apparatus of claim 34 wherein said wireless receiver is a cellular phone.

36. The apparatus of claim 34 wherein said wireless receiver is a pager.

37. The apparatus of claim 27 wherein said ghost detector comprises a correlator circuit for correlating the common digital word of each said received burst with the given common digital word to identify a correlator peak position for each burst, and an analyzer circuit for analyzing said correlator peak position for a given set of bursts to determine a change in correlator peak position therefor.

38. The apparatus of claim 37 wherein said correlator circuit comprises a correlator and a peak finder.

39. The apparatus of claim 37 wherein said analyzer circuit comprises a peak variance detector, a low pass filter and a threshold detector.

40. A wireless communication system having a wireless channel over which information bits are transmitted in burst, each burst having a given common digital word, the system comprising:
   a receiver for receiving the transmitted bursts;
   a corrector circuit for correlating the common digital word of each said received burst with the given common digital word to identify a corrector peak position, in time, for each burst;
   an analyzer circuit for analyzing said corrector peak position for a given set of bursts to determine a change in corrector peak position therefor; and
   an equalizer, being selectively engaged to support said receiver in recovering the information bits when said corrector peak position changes more than a predetermined amount, wherein a corrector peak change larger than said predetermined amount of time indicates the presence of strong ghost images on the wireless channel.

* * * * *